Sept. 16, 1969   P. M. L. SIMMONS   3,467,254
PIT DETECTOR CIRCUIT

Filed July 25, 1966   3 Sheets-Sheet 1

INVENTOR.
PATRICK M. L. SIMMONS
BY
ATTORNEYS

INVENTOR.
PATRICK M. L. SIMMONS
BY Allen and Krom
ATTORNEYS

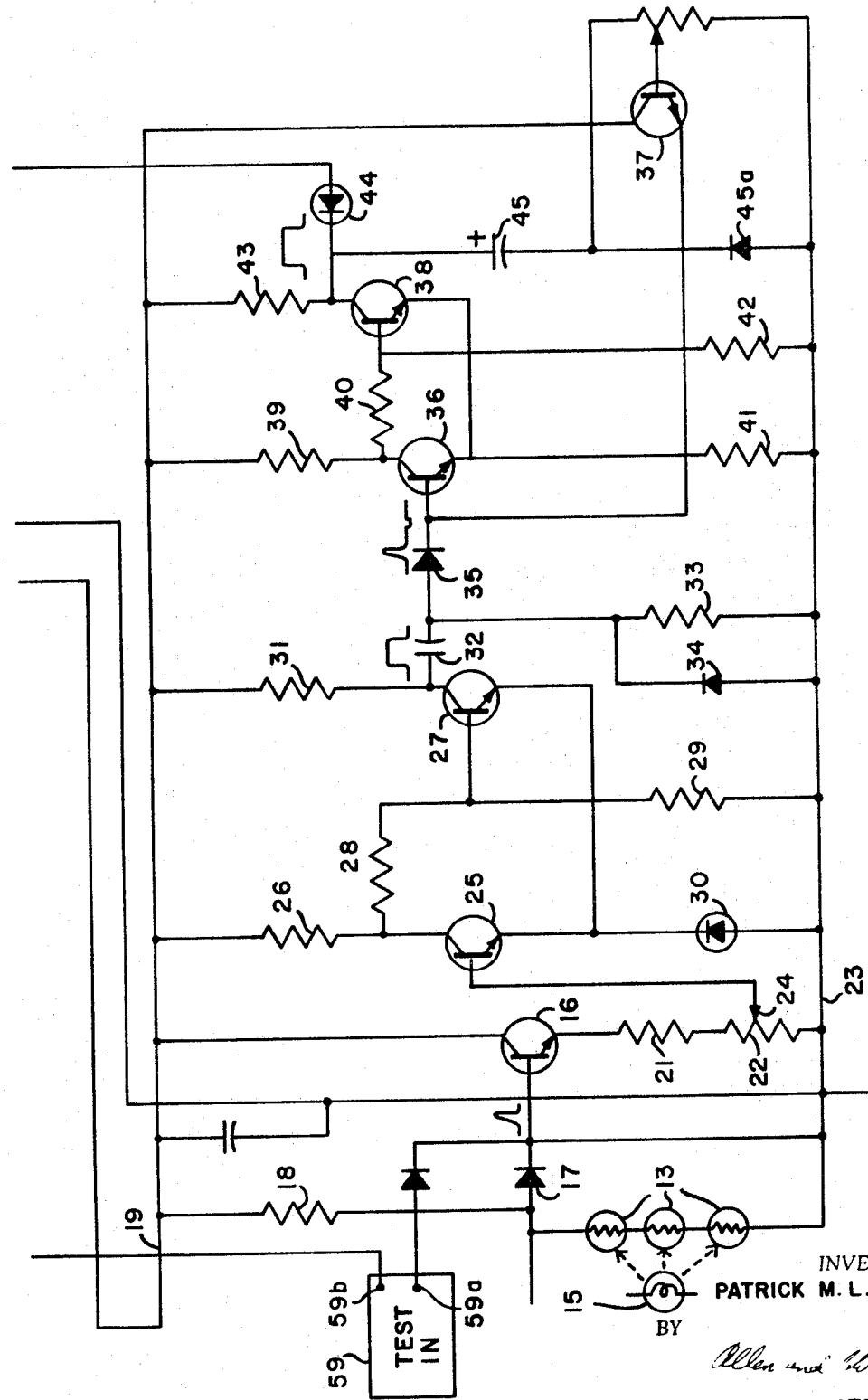

3,467,254
PIT DETECTOR CIRCUIT
Patrick M. L. Simmons, San Jose, Calif., assignor of one-half to Genevieve I Hanscom and one-half to Genevieve I. Hanscom, Robert Magnuson, and Lois J. Duggan, trustees of the estate of Roy M. Magnuson
Filed July 25, 1966, Ser. No. 567,602
Int. Cl. B07c 5/34
U.S. Cl. 209—111.6                                        4 Claims

ABSTRACT OF THE DISCLOSURE

Apparatus for detecting pits or remnants thereof in split peaches providing for positioning the split peach between a light source and a light detector. The detector produces an eletcric pulse when a pit is detected in a split peach. This pulse controls a monostable multivibrator and a time delay circuit, the output of which controls a solenoid valve which provides an air jet for deflecting the split peach having the pit.

---

This invention relates to an electronic apparatus for detecting pits or remnants thereof in peach halves or the like.

An object of this invention is to provide an improved electronic apparatus for detecting pits or remnants thereof in peach halves or similar fruit during canning operations.

Another object of this invention is to provide an improved electronic apparatus for detecting split pits in fruit such as peaches or the like, said apparatus employing a detector circuit comprising photoelectric cells over which the peach halves pass during canning operations, said detector circuit generating an electric pulse when a peach half with a split pit passes thereover, said electric pulse actuating an electric circuit which controls an electromagnetically actuated deflector for deflecting the peach half containing the split pit out of the normal product channel into an auxiliary channel.

Other and further objects of this invention will be apparent to those skilled in the art to which it relates from the following specification, claims and drawing in which, briefly:

FIGS. 3a and 3b show a wiring diagram of the electrical components employed in this apparatus.

Figure 1:
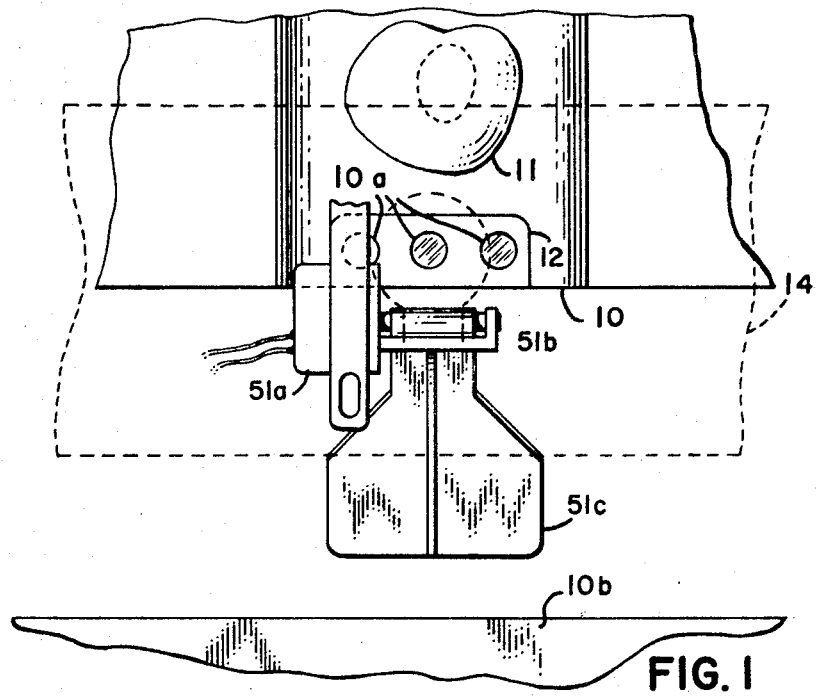
FIG. 1 is a plan view of a part of the fruit feeding channel having the split pit detector installed thereon.
Figure 2:
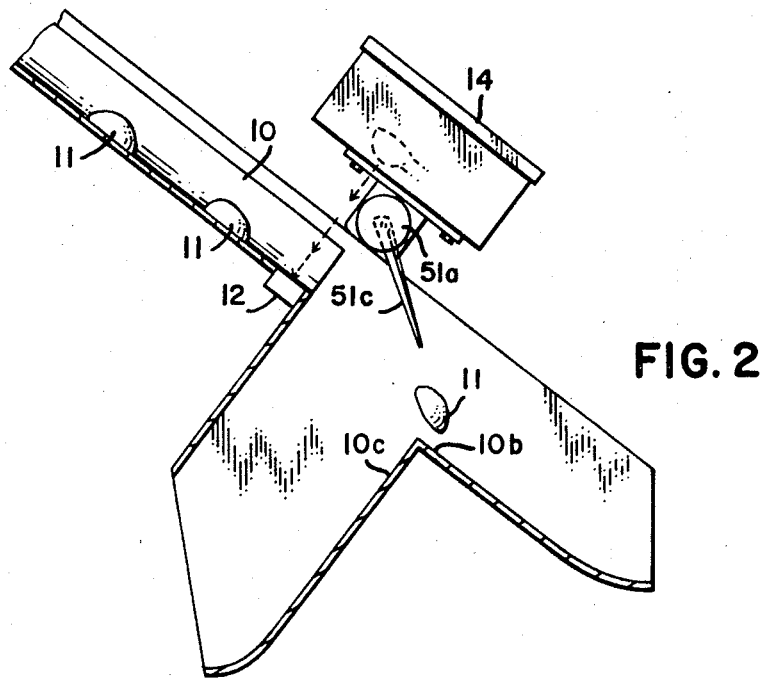
FIG. 2 is a sectional view taken along the line 2—2 of FIG. 1.
Figure 3B:
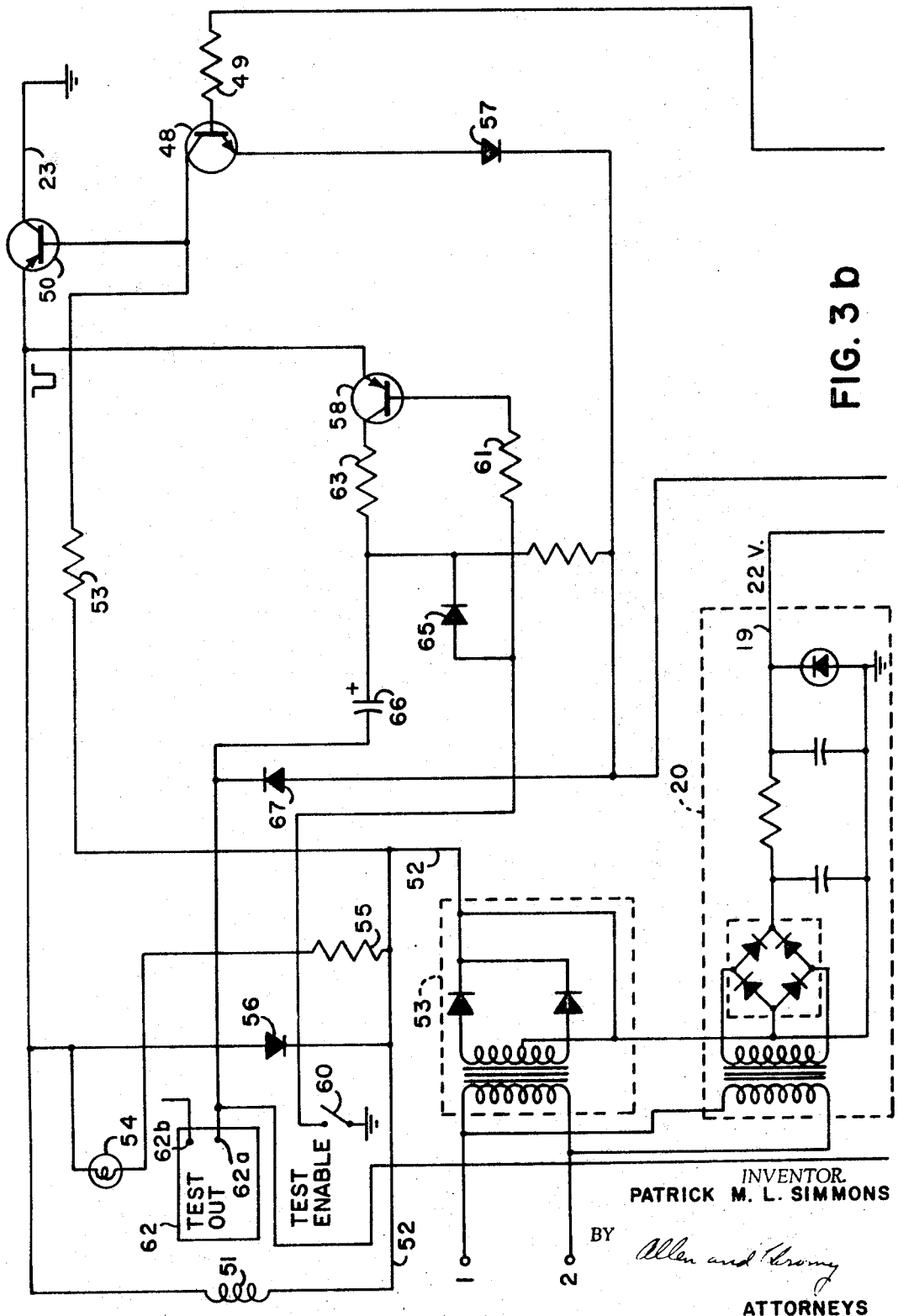

Referring to the drawing in detail, reference numeral 10 designates a trough-like channel which is inclined so that the peach halves 11 slide down it by force of gravity. An apparatus in which a plurality of such channels are positioned side by side and which are equipped with this pit detector is disclosed in Patent No. 3,381,819, issued May 7, 1968 and assigned to a common assignee. The lower end of the channel 10 is provided with three holes or apertures 10a under which the photoelectric cell housing 12 is supported. The photoelectric cells 13 are positioned in housing 12 so that they are aligned with the apertures 10a. A light source 15 is positioned in the housing 14 above the cells 13 and light generated by this light source mainly in the red end of the spectrum is directed therefrom through an aperture in the housing 14 and onto the light sensitive cells 13. The response of the light sensitive cells 13 is maximum in the orange, red part of the spectrum.

Thus, when a peach half 11 which does not have a split pit therein passes between the light source 15 and the light sensitive cell 13, the energization of the light sensitive cell is not reduced sufficiently to actuate the electric circuit connected thereto. However, whenever a peach half with a split pit therein passes between the light source 15 and light sensitive cell 13, then a positive electric pulse is supplied to the base of transistor 16 through the diode 17 by virtue of the fact that the light sensitive cells 13 are connected through the bias resistor 18 to the positive line 19 of the current supply source 20. Current supply source 20 is a conventional voltage regulated type employing a full wave rectifier and a step down transformer having a primary connected to the 115 volt A.C. lighting circuit. This source supplies D.C. at 22 volts to the photoelectric cells 13 and to the transistors of this apparatus through the positive line 19 and ground line 23.

The collector of transistor 16 is also connected to the positive supply line 19 and the emitter of this transistor is connected through resistor 21 to the upper terminal of potentiometer 22. The lower terminal of potentiometer 22 is connected to the ground line 23. The variable contact 24 of potentiometer 22 is connected to the base of transistor 25. Potentiometer 22 is employed as a sensitivity adjustment to compensate for variations in size of the peaches or other fruit being inspected, degree of ripeness and the like.

Three light sensitive cells 13 are connected in series and these cells are arranged under the apertures 10a, as shown in FIG. 1. This arrangement of light cells is employed so that peaches of different sizes may be inspected for split pits. Of course, one long light sensitive cell might be employed, if desired. The presence of a pit in a peach results in a rise in the resistance of the light sensitive cell or cells covered by the pit so that an electric pulse is transmitted to the base of transistor 16 through diode 17.

The collector of transistor 25 is connected to the positive supply line 19 through resistor 26, and it is also connected to the base of transistor 27 through resistor 28. Another resistor 29 is connected between the base of transistor 27 and the ground line 23. Thus, resistors 26, 28 and 29 are connected in series between the positive supply line 19 and the ground line 23. The emitters of transistors 25 and 27 are connected together to the cathode of the Zener diode 30. The anode of this Zener diode is connected to the ground line 23. The collector of transistor 27 is connected to the positive supply line 19 through resistor 31, and also to the differentiating circuit employing a capacitor 32 and resistor 33.

Transistors 25 and 27 comprise a Schmitt trigger circuit which generates a square pulse at the output thereof that is supplied to the differentiating circuit. The Zener diode 30 is provided so that the Schmitt trigger circuit is turned on at the same voltage at which it will turn off.

A positive pulse is generated by the differentiating circuit at the rise of the square pulse output of the Schmitt trigger. This pulse is supplied to the anode of diode 35, and the negative pulse generated by the differentiating circuit is by passed by diode 34 to the ground line 23. The cathode of diode 35 is connected to the base of transistor 36 and also to the emitter of transistor 37 which functions as a feedback transistor of the monostable multivibrator employing transistors 36, 37 and 38. The collector of transistor 36 is connected to the positive supply line 19 through resistor 39 and to the base of transistor 38 through resistor 40. The emitters of transistors 36 and 38 are connected together and the upper terminal of resistor 41, the lower terminal of which is connected to the ground line 23. The base of transistor 38 is also connected to the ground line 23 through resistor 42. Thus, resistors 39, 40 and 42 are connected in series between the positive supply line 19 and the ground 23.

The collector of transistor 38 is connected to the positive supply line 19 through resistor 43 and to the cathode of diode 44, and also to one side of the capacitor 45. The other side of this capacitor is connected to the upper terminal of potentiometer 46 and the lower terminal of this potentiometer is connected to the ground line 23. Capacitor 45 and potentiometer 46 comprise a time delay circuit which is adjustable by adjusting the variable contact 47 that is connected to the base of transistor 37. The collector of transistor 37 is connected to the positive supply line 19. Thus, by varying the variable contact 47 of the potentiometer 46, the width of the pulse produced by the monostable multivibrator may be adjusted from about zero to approximately 100 milliseconds.

The anode of Zener diode 44 is connected to the base of driver transistor 48 through resistor 49. This diode 44 prevents transistor 48 from saturating until the monostable multivibrator is in its unstable state. Thus, diode 44 is conductive during the interval of the square pulse of constant amplitude produced by the monostable multivibrator, and this interval is controlled by the potentiometer 46. Another diode 45a is provided with the cathode thereof connected to the capacitor 45 and the anode connected to the ground line 23 for discharging the negative pulse from the capacitor 45. The collector of transistor 48 is connected to the base of the transistor 50 which is the output power switch. The emitter of transistor 50 is connected to one side of the winding of rotary solenoid 51 and the other side of this solenoid is connected to the current supply line 52 from the current source 53. Source 53 employs a conventional full wave rectifier and step down transformer to supply 24 volts D.C. to energize the solenoid 51. The collector of transistor 50 is connected to the ground line 23. Thus, the transistor 50 is connected in series with the solenoid winding 51 across the current supply source 53. The collector of transistor 48, in addition to being connected to the base of transistor 50, is connected through resistor 53 to the positive supply line 52. A light 54 is connected in series with the resistor 55 across the winding 51 of the solenoid to indicate by blinking when the solenoid is energized. Also, a diode 56 which functions as a transient suppressor is connected across the solenoid winding.

The anode of diode 57 is connected to the emitter of transistor 48 and the cathode of this diode is connected to the ground line 23. Diode 57 functions to prevent transistor 50 from being turned on by transistor 48 at elevated temperatures even when no signal is supplied to the base thereof.

When the solenoid 51 is energized it functions to rotate the shaft 51b and the panel 51c is moved downward into the path of the peach half including the split pit which is deflected down to channel 10c and is prevented from moving onto the channel 10b.

Transistor 58 is employed during the testing of this apparatus. In various installations of this apparatus, as described in the aforesaid co-pending application, there may be a plurality of product feeding channels. Accordingly, a similar plurality of these inspection devices is installed so that the fruit halves passing down all of the channels are inspected simultaneously. In order that the operation of this apparatus may be checked, suitable tests are provided as described in my Patent No. 3,381,819 issued May 7, 1968. In these tests a pulse such as is obtained from the light sensitive cell 13 is applied from the pulsed multivibrator 59 to the auxiliary input terminal 59a which activates the first channel of this inspection apparatus in the same manner as a pulse derived from the light sensitive cells 13.

Pulsed multivibrator 59 is the first of a series of such oscillators provided for testing the channels of this apparatus. A separate pulsed multivibrator is provided for each channel. Thus, pulsed multivibrator 62, which is triggered by the positive output pulse from the transistor 58 of the first channel, is provided to the second channel and the output terminal 62b thereof is connected to the auxiliary input terminal of the second channel which corresponds to the auxiliary input terminal 59a of the first channel. At the same time that multivibrator 62 is triggered by the positive output pulse from transistor 58 applied to terminal 62a thereof, the preceding multivibrator 59 is triggered off by this pulse which is applied to terminal 59b thereof.

During testing of this apparatus, switch 60 is closed so that the base of transistor 58 is connected to the ground line through resistor 61. If, during the test procedure the first channel circuit functions properly, the output pulse generated at the emitter of power switch transistor 50, which is supplied to the winding of solenoid 51, is also supplied to the emitter of transistor 58. Transistor 58 generates a positive and a negative pulse at its collector, and diode 65 bypasses the negative pulse to ground through the closed switch 60. The positive pulse is supplied through capacitor 66 to trigger the multivibrator 62 on and trigger multivibrator 59 off. During the operating mode of operation switch 60 is open and at this time diode 65 functions to protect the collector junction of transistor 58.

As previously mentioned, this inspection apparatus may be provided with a plurality of inspection channels and the test portion of this apparatus includes a pulsed multivibrator for each of the channels. These pulsed multivibrators are adapted to be connected to the channels in such a way that the output test pulse of a preceding channel is adapted to trigger the multivibrator of the next succeeding channel on and trigger the pulsed multivibrator of its channel off.

While I have shown a preferred embodiment of this invention, it will be understood that the invention is capable of variation and modification from the form shown.

What I claim is:

1. In apparatus for detecting pits or remnants thereof in split peaches or like fruit during the preparation thereof for canning or other processing, the combination comprising a source of radiant energy, said source generating radiant energy that is adapted to pass through the meat of the fruit being inspected to a different extent than through the pit thereof, detector means receiving the radiant energy generated by said source, a current supply source energizing said detector means generating an electric pulse when a pit is detected by said detector means, means amplifying said pulse, adjustable means controlling the time duration of said pulse comprising a monostable multivibrator and a time delay circuit connected thereto, an electromagnetic device, means energizing said electromagnetic device in accordance with said pulse, and means controlled by said electromagnetic device when said device is energized for deflecting the fruit including the pit from the main product channel to an auxiliary channel, said means energizing said electromagnetic device comprising a driver transistor, means connecting said driver transistor to said monostable multivibrator and switching means controlled by said driver transistor.

2. In apparatus for detecting pits or remnants thereof in split peaches or like fruit during the preparation thereof for canning or other processing, the combination as set forth in claim 1 further comprising a diode connected between the emitter of said driver transistor and ground to prevent said driver transistor from turning said switching means on at elevated temperatures in the absence of signals supplied to said driver transistor.

3. In apparatus for detecting pits or remnants thereof in split peaches or like fruit during the preparation thereof for canning or other processing, the combination of fruit inspection means comprising a source of radiant energy associated with a channel through which the fruit is being moved, said source generating radiant energy that is adapted to pass through the meat o fthe fruit being inspected to a different extent than through the pit thereof, detector means associated with said channel receiving the radiant energy generated by said source, a current supply source energizing said detector means generating an electric pulse when a pit is detected by said detector means, means amplifying said pulse, adjustable means controlling the time duration of said pulse, an electromagnetic device, means energizing said electromagnetic device in accordance with said pulse, and means controlled by said electromagnetic device when said device is energized for deflecting the fruit including the pit from said channel to an auxiliary channel, means for testing said fruit inspection means to determine its operativeness comprising a pulsed multivibrator supplying an input test pulse to said amplifying means, said inspection means having means generating an output test pulse in response to said input test pulse if the fruit inspection means is in operative condition, and connections supplying the output test pulse of one of said fruit inspection means to the pulsed multivibrator connected to said fruit inspection means to trigger this pulsed multivibrator off and also supplying this output test pulse to the pulsed multivibrator of the next succeeding fruit inspection means to trigger this latter pulsed multivibrator on to supply a test pulse to the amplifying means of this latter friut inspection means.

4. In apparatus for detecting pits or remnants thereof in split peaches or like fruit during the preparation thereof for canning or other processing, the combination as set forth in claim 3 further characterized in that said means generating an output test pulse comprises a transistor circuit connected to said electromagnetic device energizing means, a test switch connected to activate said transistor during testing of the inspection means and means associated with said transistor generating the output test pulse.

References Cited

UNITED STATES PATENTS

| | | | |
|---|---|---|---|
| 3,005,548 | 10/1961 | Flanders et al. | 209—111.6 |
| 3,005,549 | 10/1961 | Flanders et al. | 209—111.6 |
| 3,005,550 | 10/1961 | Flanders et al. | 209—111.6 |
| 3,275,136 | 9/1966 | Allen et al. | 209—111.7 X |

ALLEN N. KNOWLES, Primary Examiner